Sept. 10, 1968 C. J. FRENZEL 3,401,241

SWITCHING DEVICE HAVING A PAIR OF SWITCHES AND TIME DELAY ACTUATING MEANS THEREFOR

Filed March 7, 1966

INVENTOR
CARL J. FRENZEL

BY Greist, Lockwood, Greenawalt & Dewey

ATT'YS.

United States Patent Office 3,401,241
Patented Sept. 10, 1968

3,401,241
SWITCHING DEVICE HAVING A PAIR OF SWITCHES AND TIME DELAY ACTUATING MEANS THEREFOR

Carl J. Frenzel, Chicago, Ill., assignor to Skil Corporation, Chicago, Ill., a corporation of Delaware
Filed Mar. 7, 1966, Ser. No. 532,270
11 Claims. (Cl. 200—34)

ABSTRACT OF THE DISCLOSURE

The trigger actuated switch device includes a pair of switches which are closed in sequence when the trigger is depressed. Release of the trigger causes opening of the switches in reverse sequence. A fluid-operated damper associated with the trigger retards return movement thereof to provide a time delay between opening of the switches.

This invention relates in a general way to electric switching devices, and more particularly the invention relates to a switching device having at least a pair of switches and time delay actuating means therefor.

By way of background, the present invention has particular although not exclusive application in a circuit of the type employing oppositely poled, parallel connected, controllable semiconductor devices, such as silicon controlled rectifiers, to control the flow of current to a load device. Examples of circuits of this type may be found in Gordon Patent No. 3,071,718 and Harriman Patent No. 3,097,314. Such a circuit may employ a mechanical switch in the line between the gates of the semiconductor devices thereby to control the latter. Preferably, in the interest of safety such a circuit will also include a mechanical switch in one of the lines from the A.C. power source. However, it is to be understood that energizing or de-energizing of the associated load device does not take place upon closing or opening of either of these mechanical switches; the controllable semiconductor devices actually cause energizing and de-energizing of the load. One of the advantages of such a circuit, as explained in the aforementioned Harriman patent for example, is that the contacts of the mechanical switches are not subjected to erosion or pitting caused by arcing and inductive kickback upon respective closing and opening of such switches. There is no arcing or kickback since the circuit is not actually closed or broken upon closing or opening of the mechanical switches.

When energizing a load device by a circuit of this type, it is imperative that the mechanical switch in the A.C. line be closed prior to closing of the switch in the line to the semiconductor gates in order to permit the semiconductor devices to perform the actual function of closing the circuit to the load. Likewise, when deenergizing a load device by a circuit of the type described, it is imperative that the mechanical switch in the line between the gates of the semiconductor devices be opened prior to opening of the mechanical switch in the A.C. line thereby to allow the semiconductor devices to open the circuit to the load. As will be expalined hereinbelow, it is important that there be a time delay, the extent of which depends on the frequency of the A.C. current, between opening of these switches. The present invention provides a switch device for closing these mechanical switches in sequence and for opening such switches in proper sequence and with a predetermined time interval between such opening.

A primary object of the present invention is the provision of a new and improved switching device including at least a pair of switches and actuating means for closing the switches in sequence and opening the switches in reverse sequence.

Another object of the present invention is to the provision of a switching device including a pair of switches, an actuating device movable in one direction for closing said switches in sequence and movable in another direction for opening said switches in reverse sequence, and means for retarding movement of the actuator in at least one direction of movement thereof.

Still another object of the present invention is the provision of a switching device as described in the preceding paragraph wherein the means for retarding movement of the actuating means includes a fluid operated damper.

Another object of the present invention is the provision of a switching device according to the preceding paragraphs wherein such device includes a housing having an interior space sealed to prevent entry of foreign material thereinto and wherein said damper is in communication with said interior space.

Another opject of the present invention is the provision of a switching device capable of fulfilling the aforementioned objects and including a trigger as part of the actuating means.

These and other objects and advantages of the invention will become apparent from the following specification disclosing a preferred embodiment in the accompanying drawings wherein.

Figures 1, 2, 3, 4, 5, 6:
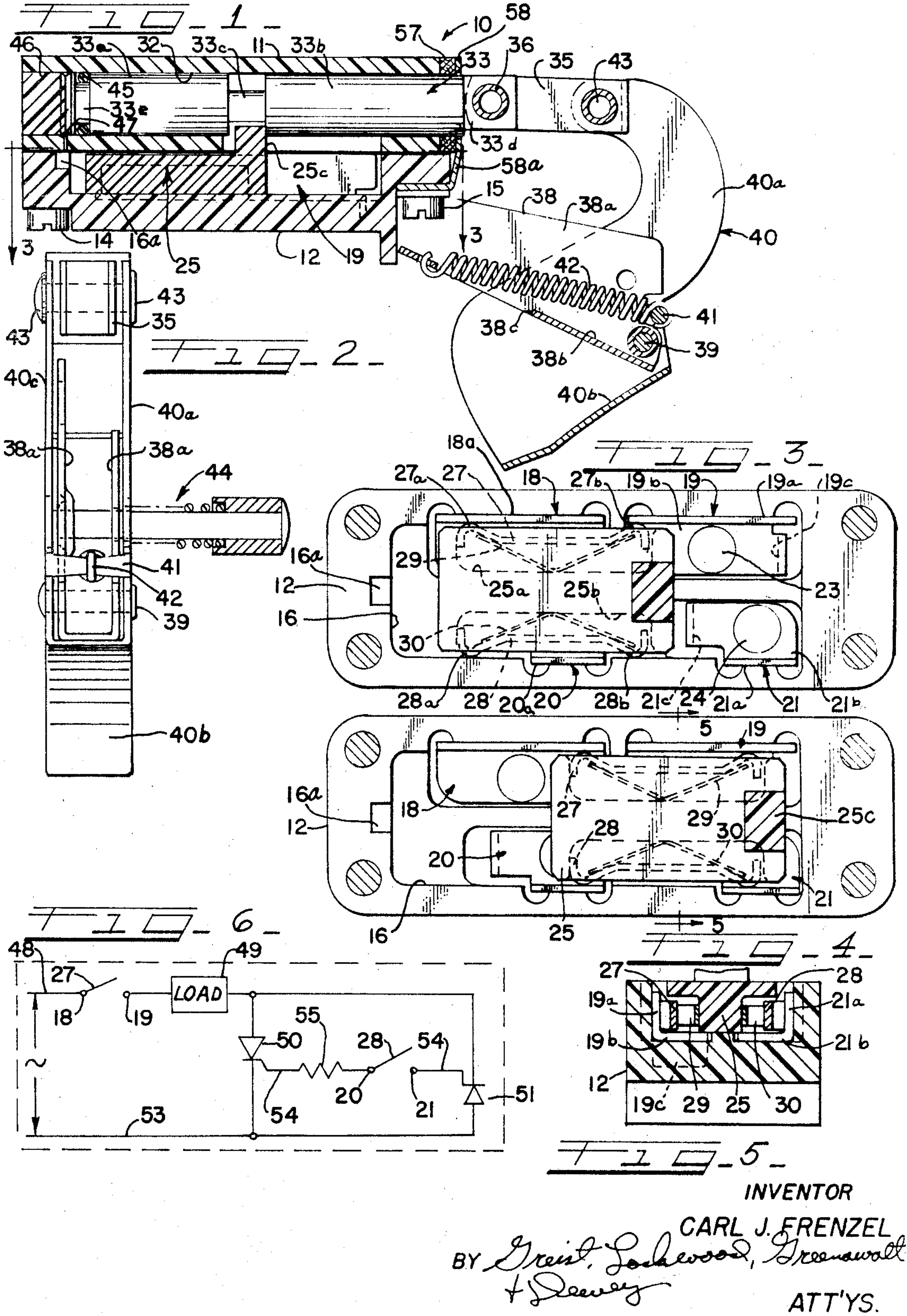
FIG. 1 is a longitudinal section taken through a preferred embodiment of the invention.
FIG. 2 is a front view of the switching device as seen from the right in FIG. 1.
FIG. 3 is an enlarged section taken along the line 3—3 of FIG. 1.
FIG. 4 is a section similar to FIG. 3 but showing both switches closed.
FIG. 5 is a section taken along the line 5—5 of FIG. 4.
FIG. 6 is a schematic diagram showing a circuit with which the present invention may be used.

The switching device of this invention includes a casing or housing 10 consisting of upper and lower parts 11 and 12, respectively, secured together in sealing relation by pairs of fasteners 14 and 15. Casing parts 11 and 12 are preferably made of a suitable dielectric material, such as plastic. Casing part 12 has an elongated cavity 16 defining a guideway in which is secured a first pair of contacts 18, 19 and a second pair of contacts 20, 21. The casing parts 11 and 12 define a closed interior space, which space includes the cavity 16.

Contacts 18 and 19 are of identical construction, and therefore only one contact, contact 19, will be described in detail. As seen in FIGS. 3 and 5, contact 19 is formed of bent metal including an upstanding planar portion **19*a* and a base portion 19*b*, which base portion is secured to the base of the cavity 16 by a suitable fastener 23. Contact 19 further includes an integral, depending leg 19*c* which adapts the contact for connection with an electrical conductor. It will be understood that contacts 18 and 19 are mounted in the cavity 16 in spaced relation and with their upstanding planar portions 18*a* and 19*a*** in substantial coplanar relationship along one side wall of the cavity.

Contacts 20 and 21 are of identical construction and therefore only one contact, contact 21, will be described in detail. Contact 21, which is similar in construction with the aforementioned contact 19, includes an upstanding planar portion **21*a* (FIGS. 3 and 5) and an integral base portion 21*b* secured to the base of cavity 16 by a suitable fastener 24. Contact 21 further includes an integral, depending leg 21*c* which adapts the contact for connection with an electrical conductor. It will be understood that contacts 20 and 21 are mounted in the cavity 16 in spaced relation with their respective planar portions 20***a* and 21*a* in substantial coplanar relationship along the other or opposite side wall of the cavity. It will be noted that contacts 20 and 21 are in general alignment with respective contacts 18 and 19 adjacent the opposite side of the cavity 16. It will also be noted that the upstanding planar portions 18*a* and 19*a* are substantially greater in length than the corresponding planar portions 20*a* and 21*a*.

A carriage 25 is mounted in cavity 16 and is guided for sliding movement in either direction therealong. Carriage 25 includes elongated, oppositely disposed recesses 25*a* and 25*b* in which respective contact strips 27 and 28 are received. It will be noted that contact strip 27 includes rounded end portions 27*a* and 27*b*. Likewise, contact strip 28 includes rounded end portions 28*a* and 28*b*. A leaf spring 29 engages the base of recess 25*a* and the contact strip 27 adjacent the ends thereof thereby yieldably urging the contact strip outwardly of the recess into sliding engagement with contacts 18, 19. In like manner, a leaf spring 30 engages the base of recess 25*b* and the contact strip 28 adjacent the ends of the latter thereby yieldably urging such contact strip outwardly of the associated recess into sliding engagement with contacts 20, 21.

Housing part 11 includes a bore 32 extending lengthwise of the cavity 16 above the same. A pin or plunger 33 is slidably mounted in the bore 32 for reciprocal movement therein. The pin 33 includes cylindrical portions 33*a* and 33*b* joined together with a reduced-in-diameter cylindrical portion 33*c*. Portion 33*c* defines an annular space which receives a lug 25*c* integral with the carriage. The reception of lug 25*c* in this annular space serves as a means for connecting the carriage with the pin 33 for movement of these two members in unison. Pin 33 includes an integral, bifurcated portion 33*d* in which is received one end of a link 35 pivotally connected therein by a suitable pin 36.

Fasteners 15, in addition to securing body parts 11 and 12 together, serve to mount a bracket 38 to the casing 10. Bracket 38 has a U-shaped cross section defined by side portions 38*a* and a bight portion 38*b*. Side wall portions 38*a* mount a pivot pin 39, opposite ends of which project beyond bracket wall portions 38*a*.

A trigger 40 is formed by bending a plate upon itself thereby forming side portions 40*a* and a connecting or web portion 40*b* which serves as the finger engaging portion of the trigger. Side wall portions 40*a* have aligned apertures receiving opposite ends of the pin 39 thereby pivotally securing the trigger 40 from the bracket 38. Wall portions 40*a* have aligned recesses in the front edges thereof receiving opposite ends of a pin 41. A spring 42 has one end thereof connected with the pin 41 and the other end thereof connected in a small aperture (not shown) formed in the bight portion 38*b* of the bracket 38. The bracket 38 includes a cut-out 38*c* to permit connecting one end of the spring into this small aperture. Trigger wall portions 40*a* are pivotally connected at their upper ends to the link 35 by means of a pin 43.

Suitable locking means, generally designated 44 in FIG. 2, are provided for locking the trigger in its squeezed or depressed position. Such locking means will not be described in detail herein as of itself it forms no part of the present invention.

The embodiment of the switching device shown for purposes of illustration has been designed for use in controlling the motor of a portable tool having a housing with a pistol grip type handle portion. The casing 10 of the switch device extends more or less axially of the pistol grip housing with the finger engageable portion 40*b* of the trigger extending through a suitable aperture in the housing. It should be apparent that squeezing of the trigger causes sliding movement of the carraige from left to right as seen in FIG. 1. Releasing of the trigger allows the spring 42 to return the carriage, i.e., slide the same from right to left as seen in FIG. 1.

It will be noted that cylindrical portion 33*a* of the pin includes an annular recess 33*e* in which is received an O-ring 45, which O-ring sealingly engages the walls of bore 32 in the housing part 11. Bore 32 is closed at the end thereof adjacent cylindrical portion 33*a* by a cylindrical insert 46. Housing part 11 includes a small diameter aperture 47 communicating bore 32 with a notch 16*a* opening into cavity 16. It will be noted that aperture 47 opens into bore 32 adjacent the inner face of insert 46. It should be apparent that bore 32 and insert 46 define a cylinder or chamber for cylindrical portion or piston 33*a*, which chamber is open to the interior of the switch housing by the aperture 47.

When the trigger 40 is squeezed thereby moving the carriage 25 and the cylinder 33*a* to the right as seen in FIG. 1, air within cavity 16 enters the bore 32 through the aperture 47. When the trigger is released, the spring 42 acts to slide the piston 33*a*, and the carriage 25 associated therewith, to the left as seen in FIG. 1 thereby forcing air in bore or cylinder 32 outwardly through the aperture 47. The air flows outwardly through the opening 47 at a rather slow rate due to the small cross sectional area of the aperture 47. The slow rate of flow through the opening 47 serves as a damper to retard return movement of the cylinder 33*a* and consequently the carriage 25. The purpose of this construction will be explained hereinbelow.

When the trigger 40 is released, the carriage 25 is slid to a position along the cavity 16 in which rounded ends 27*a* and 27*b* of the contact strip 27 are in engagement with upstanding planar portion 18*a* of the contact 18. When the carriage is in this position, rounded end 28*b* of the contact strip 28 is in engagement with upstanding portion 20*a* of the contact 20. After the carriage 25 has been slid a short distance by squeezing of the trigger, contact 27*b* then comes into sliding contact with portion 19*a* of the contact 19 (FIG. 3), thereby bridging the contacts 18 and 19 by the contact strip 27. During continued squeezing of the trigger, the contact strip 27 remains in sliding contact with both contacts 18 and 19. As the carriage 25 approaches the end of its limit of travel from left to right as seen in FIGS. 3 and 4, end 28*a* of the contact strip 28 comes into sliding contact with portion 20*a* of the contact 20; contact end 28*a* remains in sliding contact with contact portion 20*a* upon continued sliding movement of the carriage from left to right. As the carriage 25 continues its travel from left to right, contact end 28*b* comes into sliding engagement with contact portion 21*a* thereby bridging contacts 20 and 21 by the contact strip 28 (FIG. 4).

It should be apparent that contacts 18, 19 and contact strip 27 define a first switch which is open when the trigger is fully released and which is closed upon initial sliding movement of the carriage 25 caused by squeezing of the trigger. It should likewise be apparent that contacts 20, 21 and contact strip 28 define a second switch which is closed or bridged after the first switch mentioned above is closed. It will further be understood that when the trigger is released, the switch defined by contacts 20, 21 and the contact strip 28 will be opened prior to opening of the switch defined by contacts 18, 19 and the contact strip 27. During return movement of the carriage 25, which causes opening of these switches in sequence, the flow of air through the aperture 47 retards return movement of the carriage thereby providing a time delay between opening of the switches.

Referring now to FIG. 6, which shows a switching circuit in which the present invention is incorporated, it will be seen that the switch defined by contacts 18, 19 and the contact strip 27 is connected in one of the lines 48 from an A.C. power source, which line extends to a load device 49, such as a motor for example. A pair of controllable semiconductor devices, such as silicon controlled rectifiers 50 and 51, are arranged in parallel, oppositely poled relation between the load 49 and the other line 53 from the A.C. power source. The switch defined by contacts 20, 21 and the contact strip 28 is mounted in a line 54 extending between the gates of the silicon controlled rectifiers. A suitable resistor 55 is also connected in this line between the gates of the silicon controlled rectifiers.

Upon initial squeezing of the trigger, the switch defined by contacts 18, 19 and the strip 27 is closed. However, the load 49 is not energized at this time as the silicon controlled rectifiers 50, 51 have not yet been fired or caused to become conductive and therefore the silicon controlled rectifiers block the flow of current to the load. Upon continued squeezing of the trigger, the switch defined by contacts 20, 21 and contact strip 28 is closed thereby causing firing of the silicon controlled rectifiers. The silicon controlled rectifiers then become conductive thereby completing the circuit to the load 49 and thus energizing the same.

When the trigger 40 is released, the switch defined by contacts 20, 21 and contact strip 28 will first be opened, thereby opening the line between the gates of the silicon controlled rectifiers 50, 51. However, the silicon controlled rectifier that is conducting when the switch 20, 21, 28 is opened will continue to conduct current until the anode thereof becomes negative by the line voltage. The pesiod of time for the anode to become negative is no longer than one half the cycle of the line voltage. For example, with 25 cycle A.C. current, one of the silicon controlled rectifiers will continue to conduct current after opening of the switch 20, 21, 28 for a period of time which will not exceed .02 second. Therefore, the switch defined by contacts 18, 19, 27 must not be opened during this period of time. Otherwise this mechanical switch would actually open the circuit to the load device, which is not desirable as explained above. The retarded return movement of the carriage 25 caused by the restricted flow of air through the aperture 47 provides the time delay. In other words, by the time the switch 18, 19, 27 opens, both silicon controlled rectifiers 50, 51 will have been allowed to become non-conducting, and therefore the silicon controlled rectifiers and not the switch 18, 19, 27 serve to open the circuit to the load device 49.

Positive opening of the A.C. line 48 by the switch 18, 19, 27, among other things, prevents line voltage transients from false firing of the silicon controlled rectifiers.

It will be noted that a felt washer 57 is disposed adjacent the front end of upper housing part 11 in encircling relation with the pin 33. The felt washer 57 is held in place by a ring member 58, which ring has an integral extension 58*a* secured beneath the heads of fasteners 15. This felt washer snugly engages the cylindrical portion 33*b* of the pin and acts as a wiper or dust catcher for preventing the entry of foreign materials, such as dust or dirt particles, into the interior space in the switch casing. Thus, dust or dirt particles cannot enter the interior space (including the cylinder 32) in the switch casing and impair operation of the various switch contacts or the damper defined by piston 33*a*, cylinder 32 and aperture 47.

Venting or opening of bore 32 to the interior of the switch housing via aperture 47 represents a preferred form of construction. However, it will be understood that bore 32 may be vented diretly to atmosphere as by means of a small diameter aperture in insert 46, for example. In such case it would be desirable to cover the aperture in insert 46 with a suitable filter or screen to prevent the entering of foreign material into the bore 32.

While the invention has been shown in but one form, it will be obvious to those skilled in the art that it is not to be so limited. The invention is susceptible of various forms and modifications without departing from the spirit and scope of the appended claims. In this connection, it will be understood that the switching device is not to be limited to the particular trigger operated actuating means shown. Also, the switching device of this invention is not to be limited for use in the particular circuit illustrated. Further, although a mechanical switch is shown in only one of the A.C. lines, viz., the line 48, it will be realized that in some installations a switch similar to the switch 18, 19, 27 may be provided in the other A.C. line 53. In such case, both of the mechanical switches in the A.C. lines would preferably be connected together for operation in unison.

I claim:

1. A switching device comprising, a casing, a plurality of fixed and movable contacts carried by said casing and defining a pair of switches, actuating means associated with the casing and including a switch operating element movably mounted by said casing, said element being engaged with said movable contacts for operating said switches in sequence, said actuating means also including a member mounted for oscillating movement, said member being connected with said operating element for movement in unison therewith so that as the member moves in one direction said pair of switches are closed in sequence and as the member moves in the other direction said pair of switches are opened in reverse sequence, and other means engaged with said actuating means for retarding movement of said member in at least one direction of movement thereof.

2. The switching device according to claim 1 wherein said other means includes a fluid operated damper.

3. The switching device according to claim 1 wherein said actuating means includes a trigger for moving said member in said one direction and biasing means for moving said member in said other direction.

4. A switching device comprising, a casing defining a guideway, a carrier mounted on said guideway for sliding movement in either direction therealong, a first pair of contacts mounted in spaced relation along said guideway, a second pair of contacts also mounted in spaced relation along said guideway, first contact means on said carriage arranged to bridge said first pair of contacts after initial movement of said carriage in one direction and to maintain said first pair of contacts in bridged relation during continued movement of the carriage in said one direction, second contact means on said carriage arranged to bridge said second pair of contacts after said carriage has moved in said one direction a predetermined distance beyond said initial movement and to maintain said second pair of contacts in bridged relation during continued movement of the carriage in said one direction, whereby upon movement of said carriage in a direction opposite said one direction said second contact means disconnects said second pair of contacts prior to disconnecting of said first pair of contacts by said first contact means, actuating means including a member connected with said carriage for moving the same in either direction along said guideway, and other means associated with said actuating means for retarding movement of the carriage in said opposite direction thereby to establish a time delay between disconnecting of said first and second pairs of contacts.

5. The switching device according to claim 4 wherein said other means includes a fluid operated damper.

6. The switching device according to claim 4 wherein said actuating means includes a trigger for moving said carriage in said one direction and biasing means for moving said carriage in said opposite direction.

7. For use in a switching circuit of the type including oppositely poled controllable semiconductor means for controlling whether current flows between an A.C. source and a load device, a mechanical switching device for controlling said semiconductor means comprising, a casing, a plurality of fixed and movable contacts carried by said casing and defining a pair of switches, one being connectable in one of the A.C. power lines and the other being connectable in a gate line for said semiconductor means, actuating means associated with the casing and including a member mounted for oscillating movement, said member being connected with said movable contacts so that as the member moves in one direction said one switch is closed before the other and as the member moves in the other direction said other switch is opened before said one switch, and otehr means engaged with said actuating means for retarding movement of said member in said other direction thereby to establish a time delay between closing of said switches.

8. The switching device according to claim 7 wherein said other means includes a fluid operated damper.

9. The switching device according to claim 7 wherein said actuating means includes a trigger for moving said member in said one direction and biasing means for moving said member in the other direction.

10. A switching device comprising, a casing defining a rectilinear guideway, a carrier mounted on said guideway for sliding movement in either direction therealong, a first pair of contacts mounted in spaced relation along said guideway, a second pair of contacts also mounted in spaced relation along said guideway, first contact means on said carriage arranged to bridge said first pair of contacts after initial movement of the carriage in one direction and to maintain said first pair of contacts in bridged relation during continued movement of the carriage in said one direction, second contact means on said carriage arranged to bridge said second pair of contacts after said carriage has moved in said one direction a predetermined distance beyond said initial movement and to maintain said second pair of contacts in bridged relation during continued movement of the carriage in said one direction, whereby upon movement of said carriage in a direction opposite said one direction said second contact means disconnects said second pair of contacts prior to disconnecting of said first pair of contacts by said first contact means, actuating means including a member connected with said carriage for moving the same, said actuating means further including a trigger connected with said member for moving said carriage in said one direction and biasing means connected with said member for moving said carriage in said opposite direction, said member having a piston movable therewith, said casing defining a cylinder receiving said piston, and said casing further including an aperture venting said cylinder for retarding movement of the piston and consequently the carriage as the latter moves in said opposite direction.

11. A switching device comprising, a casing including a closed interior space, a portion of which defines a rectilinear guideway, a carrier mounted on said guideway for sliding movement in either direction therealong, a first pair of contacts mounted in spaced relation along said guideway, a second pair of contacts also mounted in spaced relation along said guideway, first contact means on said carriage arranged to bridge said first pair of contacts after initial movement of the carriage in one direction and to maintain said first pair of contacts in bridged relation during continued movement of the carriage in said one direction, second contact means on said carriage arranged to bridge said second pair of contacts after said carriage has moved in said one direction a predetermined distance beyond said initial movement and to maintain said second pair of contacts in bridged relation during continued movement of the carriage in said one direction, whereby upon movement of said carriage in a direction opposite said one direction said second contact means disconnects said second pair of contacts prior to disconnecting of said first pair of contacts by said first contact means, actuating means on said casing including a member extending into said interior space and connected with said carriage for moving the same, said actuating means further including an actuator connected with said member for moving said carriage in said one direction and biasing means connected with said member for moving said carriage in said opposite direction, said member having a piston movable therewith, said casing defining a cylinder receiving said piston, said casing including a small diameter aperture communicating said cylinder with said interior space for retarding movement of the piston and consequently the carriage as the latter moves in said opposite direction, and said casing further including means sealing said interior space from atmosphere thereby to prevent entry of foreign material into the former.

References Cited

UNITED STATES PATENTS

| | | | |
|---|---|---|---|
| 3,188,416 | 6/1965 | Schultz | 200—144 XR |
| 3,261,958 | 7/1966 | Bittner | 200—34 XR |

ROBERT K. SCHAEFER, *Primary Examiner.*

H. O. JONES, *Assistant Examiner.*